(12) United States Patent
Wycoff

(10) Patent No.: US 11,648,443 B2
(45) Date of Patent: May 16, 2023

(54) CUSTOM GOLF CLUB FITTING

(71) Applicant: Golf Supply of the Low Country, LLC, Hilton Head Island, SC (US)

(72) Inventor: Christopher L. Wycoff, Hilton Head Island, SC (US)

(73) Assignee: GOLF SUPPLY OF THE LOW COUNTRY, LLC, Hilton Head Island, SC (US)

( * ) Notice: Subject to any disclaimer, the term of this patent is extended or adjusted under 35 U.S.C. 154(b) by 338 days.

(21) Appl. No.: 16/826,394

(22) Filed: Mar. 23, 2020

(65) Prior Publication Data

US 2020/0298057 A1    Sep. 24, 2020

Related U.S. Application Data

(60) Provisional application No. 62/822,251, filed on Mar. 22, 2019.

(51) Int. Cl.
*A63B 69/36* (2006.01)
*A63B 24/00* (2006.01)

(52) U.S. Cl.
CPC .......... *A63B 24/0006* (2013.01); *A63B 69/36* (2013.01); *A63B 2220/05* (2013.01); *A63B 2220/807* (2013.01)

(58) Field of Classification Search
CPC . A63B 24/0006; A63B 69/36; A63B 2220/05; A63B 2220/807; G06Q 30/0282; G06Q 30/0631; G06N 20/00; G06V 40/23
USPC ................ 473/222, 223, 289, 290, 407, 409
See application file for complete search history.

(56) References Cited

U.S. PATENT DOCUMENTS

| | | | | |
|---|---|---|---|---|
| 6,041,651 A * | 3/2000 | Naruo | ................ | A63B 71/0622 473/223 |
| 6,719,648 B1 * | 4/2004 | Smith | .................... | A63B 60/46 473/409 |
| 6,966,843 B2 * | 11/2005 | Rankin | .............. | A63B 24/0021 473/202 |
| 7,041,014 B2 * | 5/2006 | Wright | ............... | A63B 69/3632 702/182 |
| 7,147,570 B2 | 12/2006 | Toulon et al. | | |
| 7,887,440 B2 * | 2/2011 | Wright | ............... | A63B 69/3632 473/223 |
| 8,113,967 B1 * | 2/2012 | Seluga | ................... | A63B 60/42 473/409 |
| 8,360,899 B2 * | 1/2013 | Swartz | ............... | A63B 69/3623 473/409 |
| 8,506,425 B2 * | 8/2013 | Wright | .................. | A63B 60/42 473/223 |
| 8,845,451 B2 * | 9/2014 | Margoles | ........... | A63B 24/0003 473/316 |
| 9,675,862 B2 * | 6/2017 | Solheim | ............. | A63B 69/3605 |

(Continued)

OTHER PUBLICATIONS

Classic Swing Golf School, http://classicswing.com/wordpress1/custom-clubs/, Nov. 20, 2018.

(Continued)

*Primary Examiner* — Nini F Legesse
(74) *Attorney, Agent, or Firm* — Burr & Forman LLP; Douglas L. Lineberry

(57) ABSTRACT

The present disclosure relates to methods and devices for custom fitting golf clubs to golfers using analysis of golf swing mechanics and data obtained from the golfer being fitted in addition to extrinsic data correlations.

13 Claims, 4 Drawing Sheets

(56) References Cited

U.S. PATENT DOCUMENTS

2004/0087384 A1    5/2004  Sosin
2005/0277483 A1*  12/2005  Peterson ................ A63B 60/42
                                                                473/282
2014/0342844 A1*  11/2014  Mooney ............. A63B 24/0006
                                                                473/266
2017/0296869 A1   10/2017  Kiryu et al.

OTHER PUBLICATIONS

Zepp Labs, Inc., GolfSense 3.0 User Guide, www.zepp.com, Aug. 2013.

McGinnis, Ryan S., et al., Golf Club Deflection Characteristics as a Function of the Swing Hub Path, The Open Sports Sciences Journal, 2010, 3, 155-164.

Kukla, Myron, Custom Clubs, The Grand Rapids Press, https://dialog.proquest.com/professional/printviewfile?accountid=157282, Nov. 20, 2018.

* cited by examiner

CUSTOM GOLF CLUB FITTING

BACKGROUND OF THE INVENTION

1) Field of the Invention

The present disclosure relates to methods and devices for custom fitting golf clubs to golfers using analysis of golf swing mechanics and data obtained from the golfer being fitted in addition to extrinsic data correlations.

2) Description of Related Art

Golf is an extremely popular sport world-wide. Indeed, in the United States alone 23.82 million people play golf. The economic impact of golf is staggering considering that in Florida alone golf has a $7.5 billion direct economic output. Indeed, youth participation is climbing with increases as high as 233 percent since 2013. Further, nearly two million jobs are generated by the golfing industry. To wit, the sport has a tremendous national impact and continues to draw in new players.

TECompany Partners provided the 2016 *U.S. Golf Economy Report*, which reported: (1) $191.9 Billion—total economic impact of golf in America, including direct, indirect and induced impacts; (2) $84.1 Billion—total size of the golf economy nationally (22% increase vs. 2011 data); (3) $58.7 Billion—total wage income from about two million U.S. jobs; (4) 15,000—approximate number of U.S. golf facilities, with about 10,000 open to the public; (5) $25.7 Billion—total in golf tourism spending; (6) $7.2 Billion—total new home construction in golf communities; (7) $6 Billion—total amount spent on golf equipment, apparel and supplies; (8) $2.4 Billion—total contributions of professional tournaments, associations and player endorsements; (9) $1.9 Billion—investment in existing golf facilities; (10) 1.9 Million—number of U.S. job impacted by the golf industry; (11) one in 75 jobs in the U.S. is impacted by the golf industry (U.S. Bureau of Labor Statistics); and (12) $38—median green fee in the U.S. as eight out of ten golfers play public golf.

A critical aspect of golf is determining the "right" club for the player. As the player's skill level increases, she often seeks to maximize her play potential by purchasing fitted clubs. Several prior systems exist for aiding a golfer in selecting clubs.

US Patent Pub. No. 2004/0087384 (Sosin '384) discloses methods of optimizing and matching golf clubs. Clubs are selected to produce a desired relationship between hand speed at impact (tempo), and centripetal force on the hands at impact (perceived force). Clubs may also be selected to minimize and equate (or reduce variation in) the radius of gyration, as measured about a center point which is individually determined for each golfer. (Abstract.) Sosin '384 explains that it provides a method of designing a matched set of golf clubs which takes into account both objective parameters which control the motion of the ball in response to an impact from a club head, and subjective parameters related to individual preferences in "feel" and idiosyncrasies of a particular golfer's swing. [0006]

US Patent Pub. No. 2017/0296869 (Kiryu '869) provides a display method that includes generating first analysis information related to at least one of a ball shooting direction and a ball curving form swing on the basis of a plurality of pieces of data related to a plurality of swings, output from an inertial sensor which is attached to a user or an exercise appliance swung by the user and measures the plurality of swings performed by the user, and generating a first region image on the basis of the first analysis information, in which the first region image includes a plurality of time-series region images, and the plurality of time-series region images are displayed in a coordinate system having at least two indexes as axes. (Abstract.)

U.S. Pat. No. 7,041,014 (Wright '014) discloses a method for matching a test golfer with a particular golf club selected from a group of golf clubs having a plurality of styles. The method utilizes a data set derived in an initial procedure in which the club style preferences for each of a large number of pre-test golfers is recorded and correlated with a set of performance parameters for the golf swings of such pre-test golfers. This data enables the pre-test golfers to be classified into subgroups, in which golfers within the same subgroup generally prefer the same club style and golfers in different subgroups generally prefer different club styles. After this data set has been established, the test golfer takes a golf swing with a golf club, while performance parameters for the swing are measured. Based on the measured performance parameters and the previously established data set, the test golfer is classified according to swing type, and the optimum golf club is then selected from the plurality of styles of golf clubs. (Abstract.)

U.S. Pat. No. 7,147,570 (Toulon '570) provides a method for effectively guiding golfers and/or their fitting professionals toward the selection of a particular wood-type golf club that is optimally matched or fitted to each golfer's particular swing characteristics, the selection being made from a set of golf clubs having at least three different head sizes and being made based on one or more swing characteristics for the golfer. (Abstract.)

However, more is needed. Given the availability of improved diagnostic devices and better understanding of the unique nature of each golfer's respective swing, a more personalize, as well as evolving, determination is needed to provide a golfer with the best club match possible. Accordingly, it is an object of the current disclosure to measure individuals on an optical motion tracking system and extracted significant swing variables and, in turn, determine a golfer's unique values, which in turn yields a recommended club profile that will work best for the golfer.

SUMMARY OF THE INVENTION

In a first embodiment, the current disclosure provides a method for fitting golfers with a golf club. The method may include applying a machine learning analysis to a data set of golf swings obtained from an optical motion tracking system to generate a predictive algorithm, obtaining optical motion tracking data from a user, and employing the predictive algorithm to recommend a golf club for the user based on the obtained optical motion tracking data from the user.

Further, the method may include updating the data set of golf swings with new swing data. Still, the data set of golf swings may be obtained from at least two golfers. Again, the optical motion tracking system measures both body and club data throughout an entire swing of at least one golfer. Yet again, the recommended golf club may identify, at least, a recommended shaft, recommended club, and recommended build for the user. Still further, the recommended golf club may identify the recommended shaft based on, at least one of, overall stiffness, overall weight, balance point, or torque of a tip section of the recommended shaft. Again, the recommended golf club may identify the recommended club based on, at least one of, weight, center of gravity of the head, coefficient of restitution of different areas of the face and moment of inertia. Still again, the recommended golf club may identify the recommended build based on, at least one of, length, swing weight, grip size, loft and lie. Yet again further, the data set of golf swings may include data from at least two golf clubs with different golf club attributes captured by the optical motion tracking system. Still yet, the recommended club may minimize dispersion of where the recommended club strikes a golf ball on a club face to produce faster ball speeds with improved spin numbers. Again still, golfers with differing physical attributes may be selected to generate the data set of golf swings. Still moreover, the method may comprise generating at least one recommended golf club profile for the user.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

Figure 1:
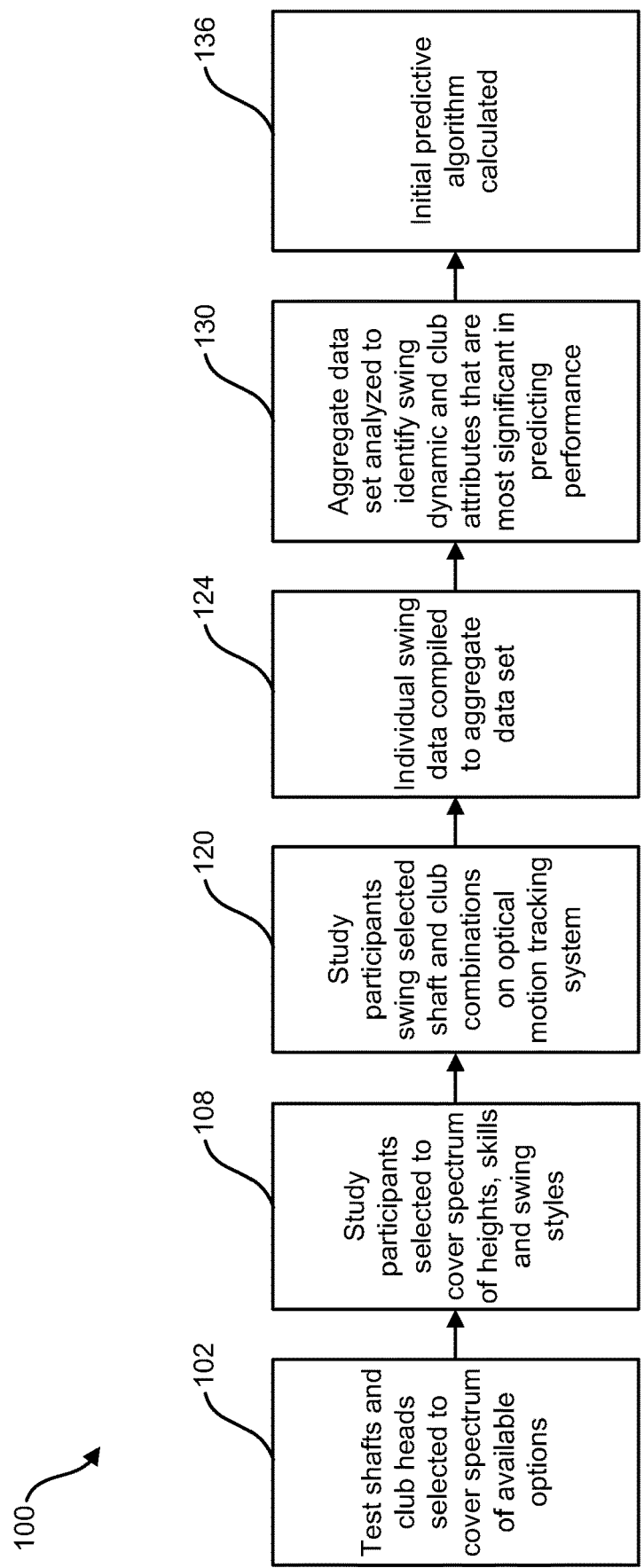
FIG. 1 shows a schematic process of one embodiment of the current disclosure.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art. Such objects, features, benefits and advantages will be apparent from the above in conjunction with the accompanying examples, data, figures and all reasonable inferences to be drawn therefrom, alone or with consideration of the references incorporated herein.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Initially, a set of data is built by having numerous golfers take swings with a control set of 3-5 clubs that have different shafts, but utilize the same club head to isolate the impact of the shaft attribute performances. These control shafts are different for irons and woods. Each set of shafts will have various attributes that span commonly available options in terms of weight, torque and the 5 main shaft attributes (Butt, Mid-Butt, Mid, Mid-Tip and Tip) on an optical motion tracking system. This optical motion tracking system measures both body and club data The set of body and club data that is collected is extensive; it includes the following set of standard body and club data that is collected in Gears software as well as custom and proprietary data that are calculated based upon raw positional data of the 34 reflectors that are placed on the body and club and measured throughout the seven main positions of a swing and at every frame capture in between. There seven main swing positions are; 1) Address—The start of the swing. 2) Mid-Back—The point before the top of the backswing where the club is parallel to the ground. 3) Top of the Backswing (Top)—The point at which the club changes directions during the backswing. 4) Mid-Down—The point after the top of the backswing where the club is parallel to the ground. 5) Impact—The point in time when the club makes contact with the ball. 6) Mid-Follow—The point after impact where the club is parallel to the ground. 7) Finish—The end of the recording. Standard club metrics include, but are not limited to: Club head strike location, club path, attack angle, face to path, spin loft, closure rate, low point, club head speed at impact point, club head speed at face center, clubhead speed ratio to grip, clubhead static loft, clubhead face center loft, clubhead address loft, clubhead impact loft, clubhead loft difference, clubhead static lie, clubhead address lie, clubhead impact lie, clubhead lie difference, face angle at face center, face angle at address, face angle at impact, face angle difference, grip speed at impact, grip roll at impact, shaft kick velocity at impact, shaft twist at impact, shaft deflection at impact, shaft droop at impact shaft deflection droop ratio, shaft lean at address, shaft lean at impact, shaft lean difference. Standard Body metrics include, but are not limited to: X-Factor, pelvis sway, pelvis thrust, pelvis lift, torso sway, torso thrust, torso lift, turn, bend, side bend, lead shoulder adduction angle, lead wrist set angle, lead wrist release velocity, kinematic sequence, joint angles, frontal bend, and lateral tilt. Custom metrics include, but are not limited to, grip speed decrease from mid down to impact, maximum deflection, percentage of downswing where maximum deflection occurs, maximum droop, percentage of downswing where maximum droop occurs, grip speed acceleration at start of downswing, direction of hand path at start of downswing and direction of hand path into impact.

Once enough data is collected, various machine learning analysis processes will analyze the data to determine how the different standard and custom swing and body metrics interact with the standard shaft attributes (Weight, Torque, Butt deflection, Mid-Butt deflection, Mid deflection, Mid-tip deflection and tip deflection) This will be turned into a predictive algorithm that will recommend top options of shaft club and build specifications for the golfer to test and select from. The recommendations will consist of specific club heads that best match performance, cosmetic, feel and brand preferences that are jointly created by the golfer and fitter, shafts with a profile that most closely matches the recommended attributes ((Weight, Torque, Butt deflection, Mid-Butt deflection, Mid deflection, Mid-tip deflection and tip deflection) and build specifications that consist of length, loft, lie and swing weight for an individual golfer based on data measured on an optical motion tracking system from their actual swings. ALGORITHM IS IN PLACE Select aspects of the predictive algorithm include the following: Grip speed decrease between mid-down and impact predicts tip stiffness along with the maximum amount of deflection, deflection decrease between mid-down and impact predicts mid-tip stiffness, maximum deflection and where it occurs predicts mid stiffness, maximum droop and grip acceleration predict butt stiffness, shape of hand path at start of downswing and kinematic sequence predict shaft weight and grip roll into impact predicts torque. Additionally, subjective feedback from the golfer regarding the feel of the weight and flex of the 3-5 control shafts used to gather initial data influence these decisions. The club head recommendations are calculated by input jointly developed between the fitter and the golfer that combine the golfers personal preferences and needed performance characteristics; these encompass top line style, softness feel, spin, launch, ball flight bias and forgiveness.

Standard Definitions

"Performance"—minimizing the dispersion of where an individual golfer strikes the ball on the face of the club.

"Shaft Profile"—Golf shafts are described by the stiffness of five (5) sections (butt, mid-butt, mid, mid-tip, and tip), overall stiffness, overall weight, balance point and the torque of the tip section.

"EI"—engineering short hand for E=Modulus of Elasticity and I=Area Moment of Inertia. Or, more simply, the elasticity of the shaft material and the thickness of the cross section of the shaft. The combination of these combine into the stiffness of the shaft at any point on the shaft. If the walls are thicker, that section of the shaft is stiffer. If the graphite strands are running from butt to tip, the stiffness they give to the shaft is more than if they are angled to control torque.

"Club Specifications"—weight, center of gravity of the head Moment of Inertia ("MOI") (resistance to twisting), and the coefficient of restitution of different areas of the face The coefficient of restitution is a measurement of the energy loss or retention when two objects (the golf club head and the ball) collide. The COR measurement is always expressed as a number between 0.000 (meaning all energy is lost in the collision) and 1.000 (which means a perfect, elastic collision in which all energy is transferred from one object to the other). The COR varies at different points of the club face and will be matched to golfers based on where their golf ball usually hits the club face.

"Build Specifications"—attributes of assembled club that includes length, swing weight, grip size, loft and lie. Loft is a measurement of the angle the club face is tilted away from perpendicular to the ground (meaning that if the shaft is held perpendicular to the ground, a club with a loft of zero would also be perpendicular to the ground while a club with a loft of 45* would be tilted back halfway between perpendicular and parallel to the ground). Lie is the angle between the shaft and bottom of the club head when viewed from behind the golf club (a lie angle of 90* would mean that the bottom of the club and the shaft are perpendicular while 45* would mean the shaft is bent down towards the ground halfway between perpendicular and parallel.)

Tools Used

In one embodiment, an optical motion tracking system that measures multiple points on the body as well as the club may be employed. The system may be comprised of eight, 1.7 megapixel cameras running at 360 frames per second. Measurements from such as system are accurate to within 0.2 mm.

Swingweight scale—device used to measure both the static weight and swing weight of standard set of clubs used for testing.

Shaft profiler—measures the EI or stiffness of the shaft at multiple points along the shaft do provide a consistent data set across brands.

Torque gauge—measures the torque of the tip section of golf shafts.

Machine Learning—varying statistical analysis approaches used to determine correlations between various swing variables and club specifications. These may include, but are not limited to: (1) collaborative filtering, —theory: https://en.wikipedia.org/wiki/Collaborative_filtering, which is hereby incorporated by reference, assume there is a large database of players, each having results with at least four (4), although more are contemplated as disclosed herein, shafts and the shafts they ended buying; a new player will first try the test shafts; the current disclosure finds the most similar players in the database given how they perform on the test shafts; the current disclosure recommends shafts that those similar players bought; (2) regression analysis, —theory: https://en.wikipedia.org/wiki/Regression_analysis, which is hereby incorporated by reference, given input data, one may predict a value; for example, given the properties of a house (location, area, age), one wants to predict the sale price, here, the current disclosure would have features computed from the player's shots and a particular shaft; the current disclosure may compute a score—how good that shaft would be for the player; (3) Rule-based system, —theory: https://en.wikipedia.org/wiki/Rule-based_system, which is hereby incorporated by reference, involves the use of a set of hand-crafter rules; based on features extracted from the player's test shots, the current disclosure may use rules to score and rank all the shafts on sale. Other possible methods include ensemble methods—including random forests, nearest neighbors, neural networks, ridge regression, support vector machines, mixture models and clustering.

Initial Data Set

A large study of golfers with varying abilities was conducted. Each golfer was asked to hit five (5) balls with eight (8) separate clubs. Each club included a different shaft, with different attributes. That is golf clubs have different golf club attributes based on the different physical characteristics of the clubs vis-à-vis one another. Shafts were chosen to cover the range of commonly available options for each of the shaft dimension we use (Shaft Profile—Golf shafts are described by the stiffness of five (5) sections (butt, mid-butt, mid, and mid-tip and tip), overall stiffness, overall weight, balance point and the torque of the tip section). The stiffness is measured using a proprietary tool that applies a standard load on the golf shaft that is positioned so that it spans two points located 6" apart. The amount that that shaft deflects under the load is measured and used to indicate the stiffness of the shaft at that point.

This initial data set was analyzed with multiple machine learning techniques to understand what swing attributes were the most significant in terms of club performance and how those swing attributes interacted with various club attributes to impact performance. Through this analysis, the current disclosure measured individuals on an optical motion tracking system and extracted significant swing variables and determined the golfer's unique values, which in turn yields a recommended club profile that will work best for the golfer. Grip speed decrease between mid-down and impact predicts tip stiffness along with the maximum amount of deflection, deflection decrease between mid-down and impact predicts mid-tip stiffness, maximum deflection and where it occurs predicts mid stiffness, maximum droop and grip acceleration predict butt stiffness, shape of hand path at start of downswing and kinematic sequence predict shaft weight and grip roll into impact predicts torque. Additionally, subjective feedback from the golfer regarding the feel of the weight and flex of the 3-5 control shafts used to gather initial data influence these decisions. The club head recommendations are calculated by input jointly developed between the fitter and the golfer that combine the golfers personal preferences and needed performance characteristics; these encompass top line style, softness feel, spin, launch, ball flight bias and forgiveness. Additionally, there are limits to the shaft recommendations based upon swing speed at impact. Meaning that overall stiffness and weight recommendations are limited by that golfer's swing speed (if a golfer has a swing speed with his/her driver of 140 mph they will not be provided with recommended driver shaft of less than 70 grams. Conversely, if a golfer has an iron swing speed of 60 mph hour they would not be provided recommended shafts of more than 105 grams and high overall stiffness).

Shaft and Club Head Data Base

A database of individual club heads and shafts that stores their individual specifications has been compiled. Measurements (Standard club metrics include, but are not limited to: Club head strike location, club path, attack angle, face to path, spin loft, closure rate, low point, club head speed at impact point, club head speed at face center, clubhead speed ratio to grip, clubhead static loft, clubhead face center loft, clubhead address loft, clubhead impact loft, clubhead loft difference, clubhead static lie, clubhead address lie, club-head impact lie, clubhead lie difference, face angle at face center, face angle at address, face angle at impact, face angle difference, grip speed at impact, grip roll at impact, shaft kick velocity at impact, shaft twist at impact, shaft deflection at impact, shaft droop at impact shaft deflection droop ratio, shaft lean at address, shaft lean at impact, shaft lean difference. Standard Body metrics include, but are not limited to: X-Factor, pelvis sway, pelvis thrust, pelvis lift, torso sway, torso thrust, torso lift, turn, bend, side bend, lead shoulder adduction angle, lead wrist set angle, lead wrist release velocity, kinematic sequence, joint angles, frontal bend, and lateral tilt. Custom metrics include, but are not limited to, grip speed decrease from mid down to impact, maximum deflection, percentage of downswing where maximum deflection occurs, maximum droop, percentage of downswing where maximum droop occurs, grip speed acceleration at start of downswing, direction of hand path at start of downswing and direction of hand path into impact. These data points are stored for every frame capture throughout the entire swing. Additionally, The club head recommendations are calculated by input jointly developed between the fitter and the golfer that combine the golfers personal preferences and needed performance characteristics; these encompass top line style, softness feel, spin, launch, ball flight bias and forgiveness. are stored for each attribute deemed necessary to determining a golfer's swing and club fit. When an initial algorithm recommends a preferred profile for a golfer, that profile is referenced against this data base to find the closest matches that are then given as recommendations to that golfer. Club head attributes include top line style, softness feel, spin, launch, ball flight bias and forgiveness (COR of various points across the face as well as MOI). Shaft attributes include Weight, Torque, Butt deflection, Mid-Butt deflection, Mid deflection, Mid-tip deflection and tip deflection) and build specifications that consist of length, loft, lie and swing weight.

Performance Parameters that may be used to help establish the database and, ultimately, determine a best club match, include, but are not limited to: hand speed acceleration at start of downswing—distance hands move in first 0.1 of downswing; angle hands travel in last 0.1 seconds before impact; club head acceleration into impact; rate of club head rotation into impact; rate hands decelerate along hand path going into impact; maximum amount of shaft deflection, percentage of downswing completed when shaft reaches maximum deflection; maximum amount of shaft droop; angle hands travel at start of downswing.

With respect to the existing devices/methods available to golfers, the current disclosure provide the following improvements over what has come before. For instance, fitting recommendations are directly correlated to shaft profile recommendations. For example, if a golfer's acceleration from top of downswing is 80% of the max in the current disclosure's range, the method of the current disclosure would recommend a shaft that has a butt section that is 80% of the max there are multiple swing attributes that are measured and calculated to recommend various sections in the shaft profile. These attributes may have different weights and ratios that factor into the recommended shaft attributes in the current disclosure's shaft range. In contrast, prior attempts, such as Tuolon '570, takes a measurement, breaks scores into groups (high, medium, low), and then makes a recommendation for a shaft profile (example—stiff, medium, soft). The current disclosure provides a full club recommendation, which includes shaft, club and build specifications. In contrast, Tuolon '570 only recommends a shaft.

Further, the algorithm of the current disclosure is constantly refined with inclusion of data from participants In addition, data shows that club variations have very little impact on club head speed at impact. Therefore, an initial focus of the current disclosure is on minimizing the dispersion of where the club strikes the ball on the club face to produce faster ball speeds with improved spin numbers. In addition, the current disclosure may also provide recommendations for shaft and build specifications intended to modify the actual swing (change swing path, body position, etc.) In other embodiments, changes may be employed to the on-site fitting data collection tool to something less expensive and easier, such as a club fitted with a gyroscopic measuring system and/or accelerometers.

In one embodiment, the current disclosure employs an optical motion tracking system to collect swing data, analyze correlations and then make recommendations for that golfer. Then, the current disclosure recommends both a shaft and a club head. Further, the current disclosure may recommend, for purposes of example only and not intended to be limiting, the top three to five options during fitting followed by the golfer testing these recommended options from an extensive set of club heads and shafts that have universal connectors on them that allow for quick and easy assembly for testing. A set would consist of at least fifty (50) club heads and over two hundred-fifty (250) shafts allowing for over twenty thousand (20,000) combinations available for a golfer to test before making a final choice. In addition, the current disclosure continually improves its algorithm through incorporation of data from every fitting.

FIG. 1 shows a schematic representation of one embodiment of initial data set collection 100 of the current disclosure. At step 102, test shafts 104 and club heads 106 are selected to cover a spectrum of available options. At step 108, study participants 110 are selected cover a spectrum 112 of physical heights 114, skill levels 116, and swing styles 118. At step 120, study participants 10 swing selected shafts 104 and club heads 106 in various combinations of the two while being monitored by an optical motion tracking system 122. At step 124, individual swing data 126 is compiled to form aggregate data set 128. At step 130, aggregate data set 128 is analyzed to identify swing dynamic 132 and club attributes 134 that are most significant in predicting performance. At step 136, an initial predictive algorithm 138 is calculated.

Figure 2:
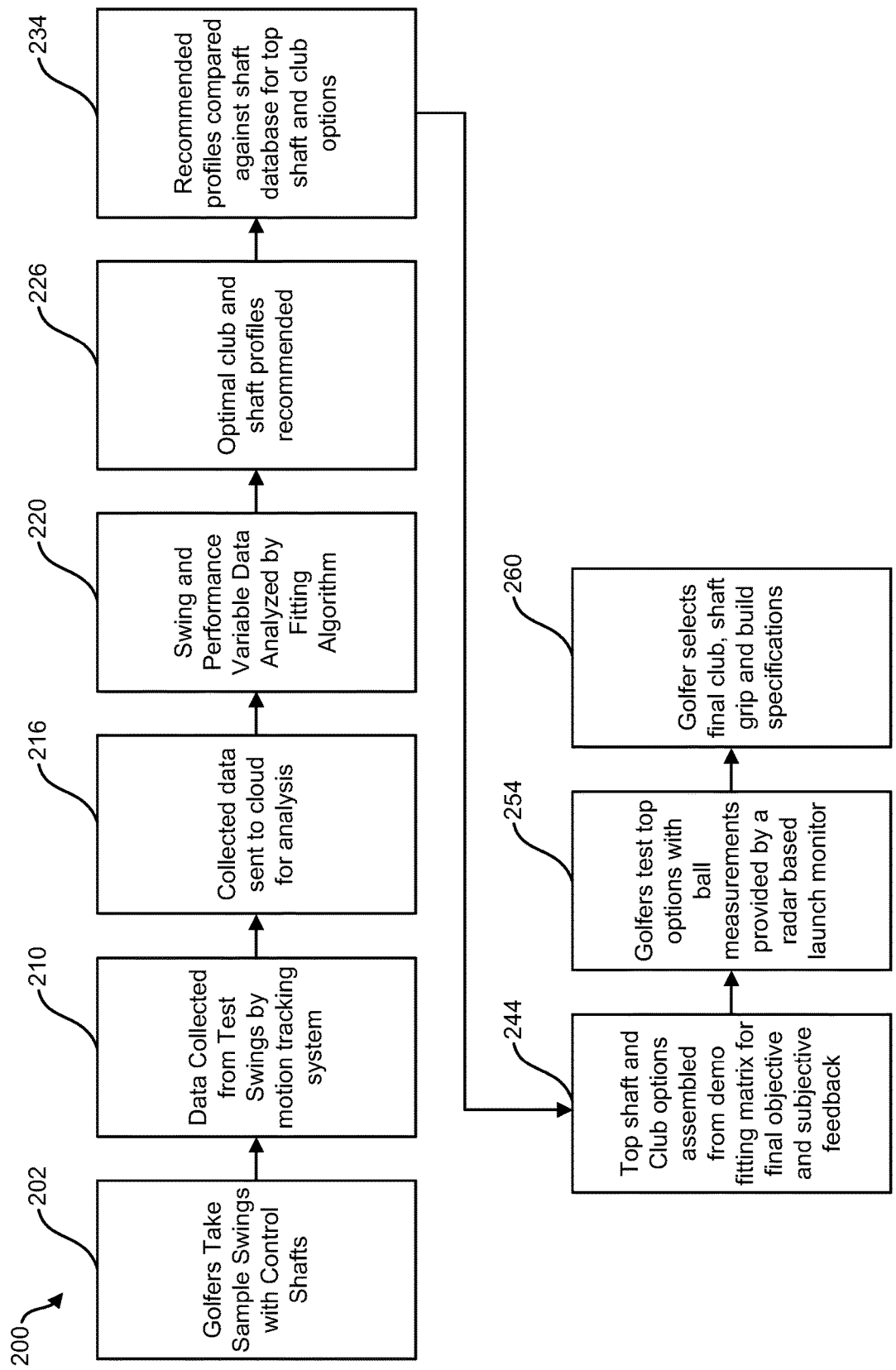
FIG. 2 shows a fitting session process of the current disclosure.

FIG. 2 shows fitting session process 200. At step 202, golfers 204 take sample swings 206 with control shafts 208. At step 210, data 212 is collected from test swings 206 by a motion tracking system 214. At step 216, data 212 is sent to cloud 218, or other analytical analysis platforms as understood by those of skill in the art, for analysis. At step 220, swing and performance data 222, which may be the same or different than data 212, is analyzed by fitting algorithm 224. At step 226, optimal club 228 and optimal shaft 230 create recommended profiles 232 are recommended. Shaft profiles consist of weight, torque, butt deflection, mid-butt deflection, mid deflection, mid-tip deflection and tip deflection) and club head profiles include top line style, softness feel, spin, launch, ball flight bias and forgiveness (COR of various points across the face as well as MOI). At step 234, recommended profiles 232 are compared against shaft database 236 for optimal shaft 238 and optimal club 240 options 242. At step 244, optimal shaft 238 and optimal club 240 options 242 are used to assemble fitted club 246, which may be a single club or multiple clubs assembled per options 242, from a demo fitting matrix 248 for objective feedback 250 and subjective feedback 252. At step 254, golfers 204 test fitted club 246 via ball measurements 256 analyzed by a launch monitor 258, which in one embodiment, may be a radar-based system. At step 260, golfers 204 select final club 262, which may include final club 264, final shaft 266, and final grip 268 specifications derived from the fitting session process 200.

Figure 3:
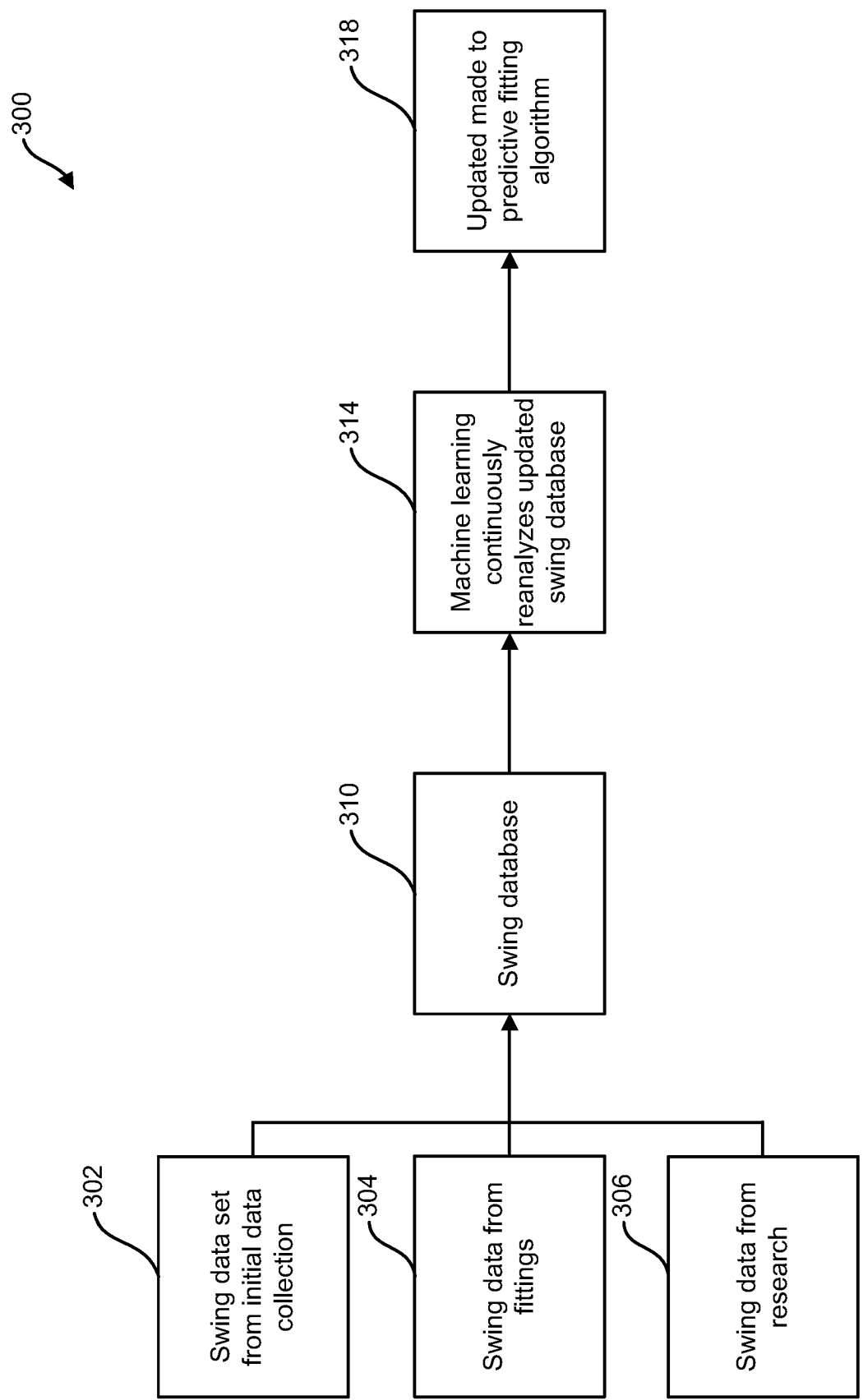
FIG. 3 shows one embodiment of a continuous algorithm improvement process of the current disclosure.

FIG. 3 shows one embodiment of a continuous algorithm improvement process 300 of the current disclosure. Here, information sources 302, 304 and 306, wherein 302 is initial swing data 303 from initial data collection 305, may be combined information source 304, here swing fitting data 307, and also combined with information source 306, which may comprise research swing data 308, to form 310 a swing database 312 wherein at 314 machine learning 316, as known to those of skill in the art, continuously reanalyzes swing database 312 to form 318, a continuously updated predictive fitting algorithm 320.

Figure 4:
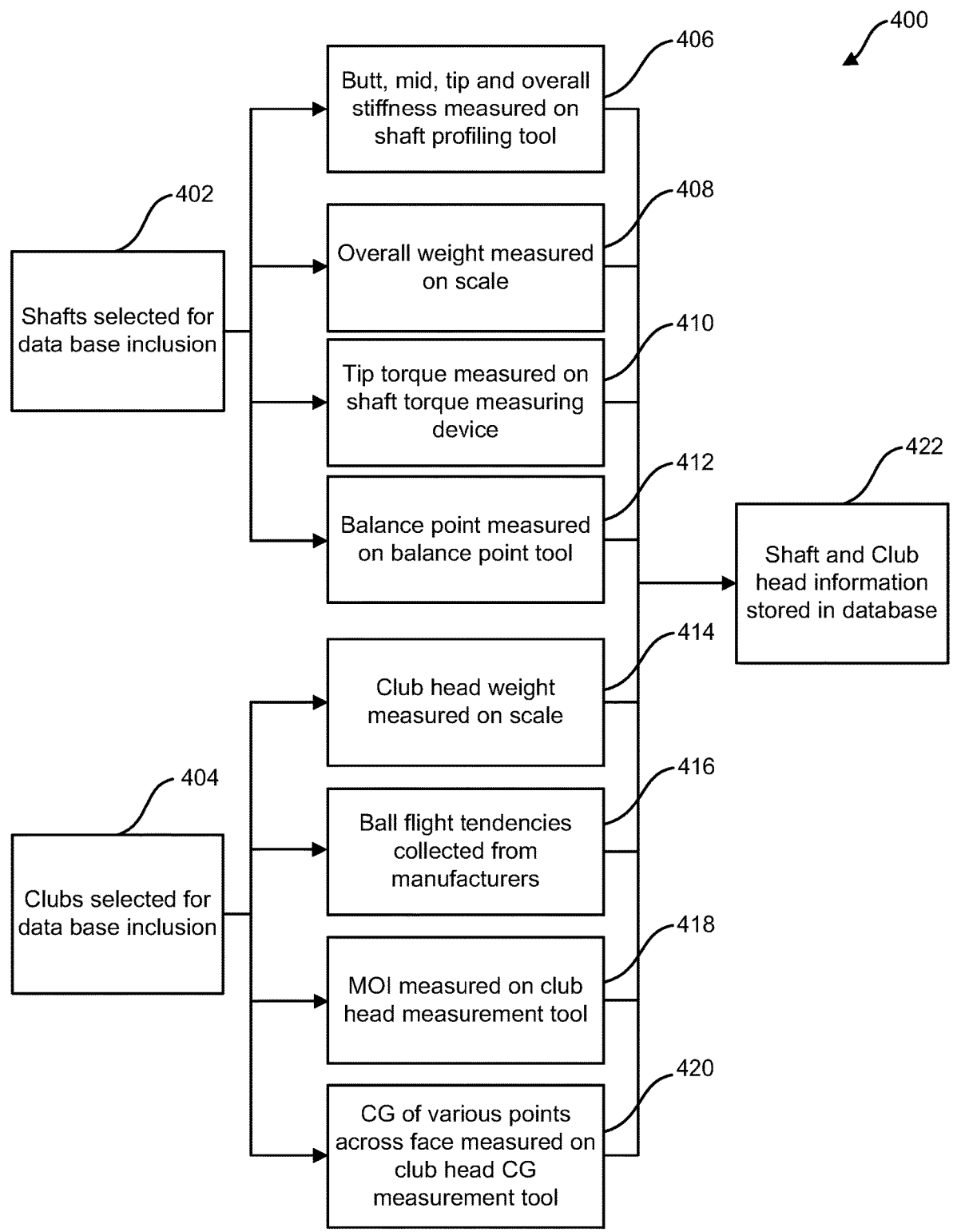
FIG. 4 shows one embodiment of components of a shaft and club head database of the current disclosure.

FIG. 4 shows one embodiment of a shaft and club head database 400 of the current disclosure. Shaft and club head database 400 may comprise a selection of data base included shafts 402 and data base included clubs 404. Shaft selection 402 may further include database subcategories 406, 408, 410, 412 and club database 404 may include subcategories 414, 416, 418, 420. The shaft subcategories may be, for purposes of example only and not intended to be limiting: 406—butt, mid tip and overall shaft stiffness measure via a shaft profiling too, 408—overall weight measured via a scale; 410—tip torque measured via a torque measuring device; and 412—shaft balance point determined via a balance point tool. Meanwhile, the club subcategories may be, for purposes of example only and not intended to be limiting: 414—club head weight measured on a scale; 416 ball flight tendencies once impacted by the club as determined from manufacturer information; 418—moment of inertia ("MOI") measured via a club head measurement tool; and 420—center of gravity for various points across the club face as determined via a club head center of gravity measurement tool. The above information, as well as other information, may be compiled to form a shaft and club head information database 422.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method for fitting golfers with a golf club comprising:
    applying a machine learning analysis to a data set of golf swings obtained from an optical motion tracking system to generate a predictive algorithm;
    obtaining optical motion tracking data from a user;
    employing the predictive algorithm to recommend a golf club for the user based on the obtained optical motion tracking data from the user; and
    wherein the method provides a full club recommendation for the user comprising a proposed shaft specification, a proposed club head specification, as well as a proposed build configuration for the user so that these recommendations are used to assemble a club based on combining the proposed shaft specification, the proposed club head specification, as well as the proposed build configuration.

2. The method of claim 1, wherein the data set of golf swings is updated with new swing data.

3. The method of claim 1, wherein the data set of golf swings is obtained from at least two golfers.

4. The method of claim 1, wherein the optical motion tracking system measures both body and club data throughout an entire swing of at least one golfer.

5. The method of claim 1, wherein the recommended golf club will identify, at least, a recommended shaft, recommended club, and recommended build for the user.

6. The method of claim 5, wherein the recommended golf club will identify the recommended shaft based on, at least one of, overall stiffness, overall weight, balance point, or torque of a tip section of the recommended shaft.

7. The method of claim 5, wherein the recommended golf club will identify the recommended club based on, at least one of, weight, center of gravity of the head, coefficient of restitution of different areas of the face and moment of inertia.

8. The method of claim 5, wherein the recommended golf club will identify the recommended build based on, at least one of, length, swing weight, grip size, loft and lie.

9. The method of claim 1, wherein the data set of golf swings includes data from at least two golf clubs with different golf club attributes captured by the optical motion tracking system.

10. The method of claim 1, wherein the recommended club minimizes dispersion of where the recommended club strikes a golf ball on a club face to produce faster ball speeds with improved spin numbers.

11. The method of claim 1, wherein golfers with differing physical attributes are selected to generate the data set of golf swings.

12. The method of claim 1, further comprising generating at least one recommended golf club profile for the user.

13. The method of claim 1, wherein the method further comprises modifying the user's swing via a suggested assembled club crafted from the full club recommendation.

* * * * *